United States Patent [19]

Brooks

[11] Patent Number: 4,529,674
[45] Date of Patent: Jul. 16, 1985

[54] EXPLOSION PROOF BATTERY

[76] Inventor: Alan C. Brooks, 608½ N. State St., Marengo, Ill. 60152

[21] Appl. No.: 591,123

[22] Filed: Mar. 19, 1984

[51] Int. Cl.³ .............................................. H01M 2/12
[52] U.S. Cl. ........................................ 429/71; 429/72; 429/82; 429/89
[58] Field of Search ................. 429/71, 72, 82, 84, 429/89, 87; 220/367, 373; 431/356; 98/115 R, 115 VM, 115 LH

[56] References Cited

U.S. PATENT DOCUMENTS 4,066,825  1/1978  Eberle ................................. 429/71
4,306,002  12/1981  Heiser et al. ...................... 429/89 X

*Primary Examiner*—Anthony Skapars
*Attorney, Agent, or Firm*—Russell L. Johnson

[57] ABSTRACT

Apparatus for eliminating the possibility of propagation of gas ignition from the outside to the interior of wet cell batteries such as those used in autos, boats, tractors and the like. The invention in its simplest form is characterized by a set of chambers attached to or incorporated with the structure of a wet cell battery to form a single compact explosion proof battery assembly. The chambers contain non flammable liquid through which gases traveling to and from the interior of the battery pass and thereby create a barrier to the propagation of ignition from the outside of the battery to the interior of the battery. Supporting inventive means are provided to make the apparatus fully functional and practical. Such supporting means include an injection fill means, a liquid level indicator and a pressure release tube for conducting gases safely away from the apparatus.

5 Claims, 4 Drawing Figures

EXPLOSION PROOF BATTERY

BACKGROUND OF THE INVENTION

Wet cell batteries evolve combustible gases at times when current is flowing into and/or out of the battery. A hazard of such batteries is that ignition of these gases from an external source can be propagated into the battery and result in an explosion. The need to provide means to vent the gases and from time to time add fluid to the battery has heretofore provided routes of ignition propagation from the outside to the interior of the battery.

BRIEF DISCUSSION OF THE PRIOR ART

Prior art attempts to provide an explosion proof wet cell battery have to a large extent been limited to providing means for passing gases going to and coming from the battery(s) through a liquid trap and venting or burning the combustible gases in a safe and controlled manner. These apparatus have been associated with fixed location applications for laboratory and industrial use and in general are unsuitable for use with vehicles and general utility applications wherein size and space requirements preclude the use of these prior art apparatus.

OBJECTS

It is therefore an object of this invention to provide an apparatus for rendering a general utility wet cell battery explosion proof while not restricting the manner of utilization of the battery in any important way.

It is further an object of this invention to provide the apparatus described above such that the apparatus may be incorporated with the structure of a battery to create a substantially unitary structure.

It is further an object of this invention to provide the apparatus as described above wherein means for determining the liquid level in the cells of the battery, means for injecting fluid into the cells when needed and means for safely conducting combustible gases away from the battery are provided.

Other objects will become apparent from the following specifications, drawings, and claims.

BRIEF DESCRIPTION OF THE INVENTION

The invention in its preferred form is characterized by a rail structure that covers the fill ports of a wet cell battery and is sealed to the top of the battery and a chamber filled with non combustible anti freeze liquid attached to one of the vertical sides of the battery and the chamber and sealed passages are provided between the rail and the chamber so that gases passing to and from the cells of the battery must pass through the non combustible anti freeze liquid. A compact explosion proof battery of substantially unitary construction is thus achieved.

DETAILED DESCRIPTION OF THE INVENTION

In the figures, like numbers refer to like objects.

Figure 1:
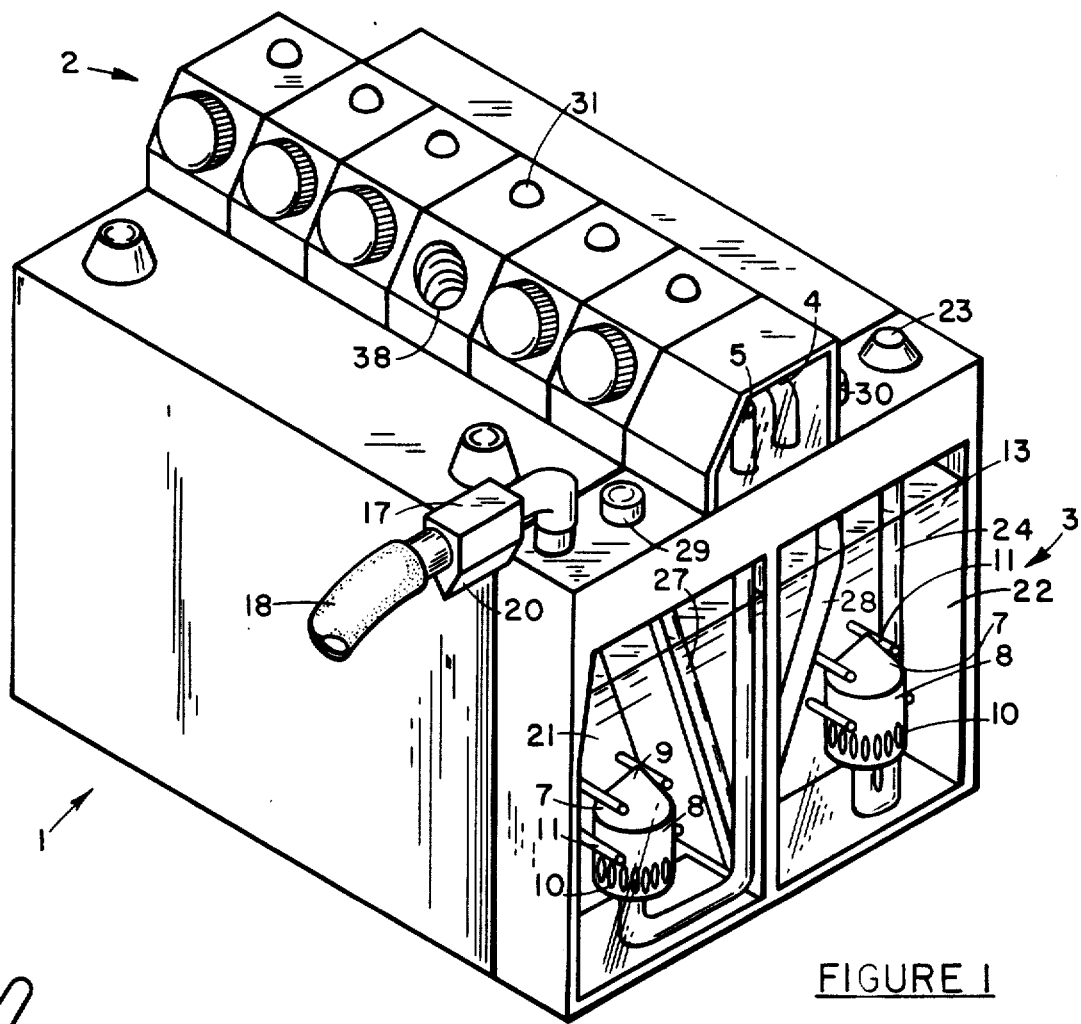
FIG. 1 is a pictorial view of the device of this invention.
Figure 3:
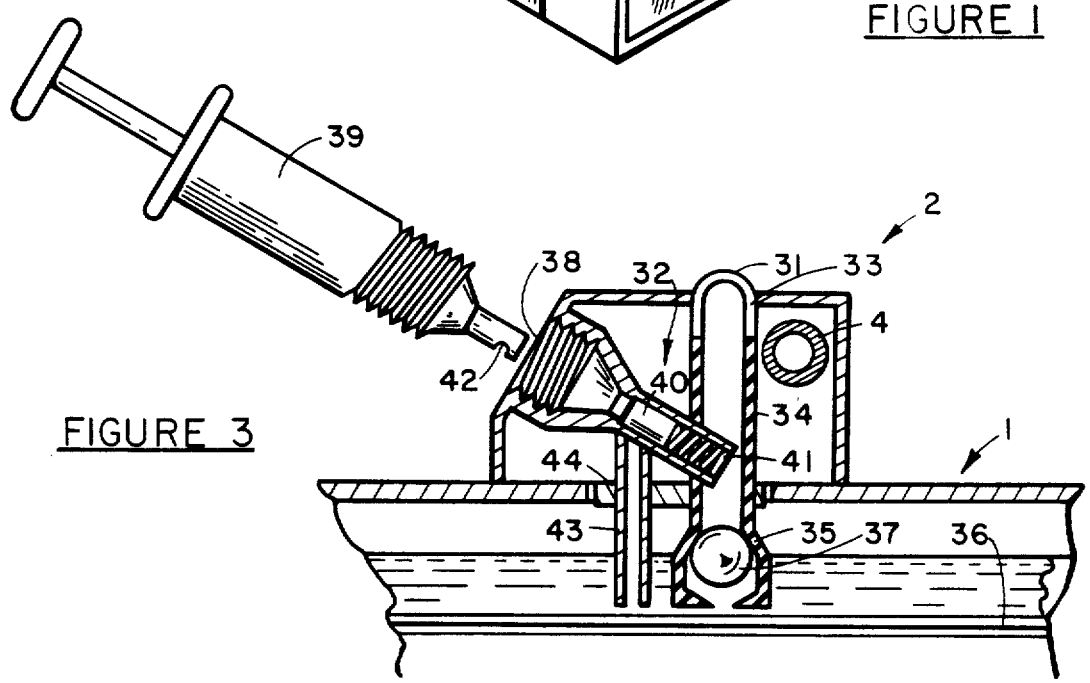
FIG. 3 is a sectional elevational view showing the sight tube and syringe fill features of this invention.
Figure 2:
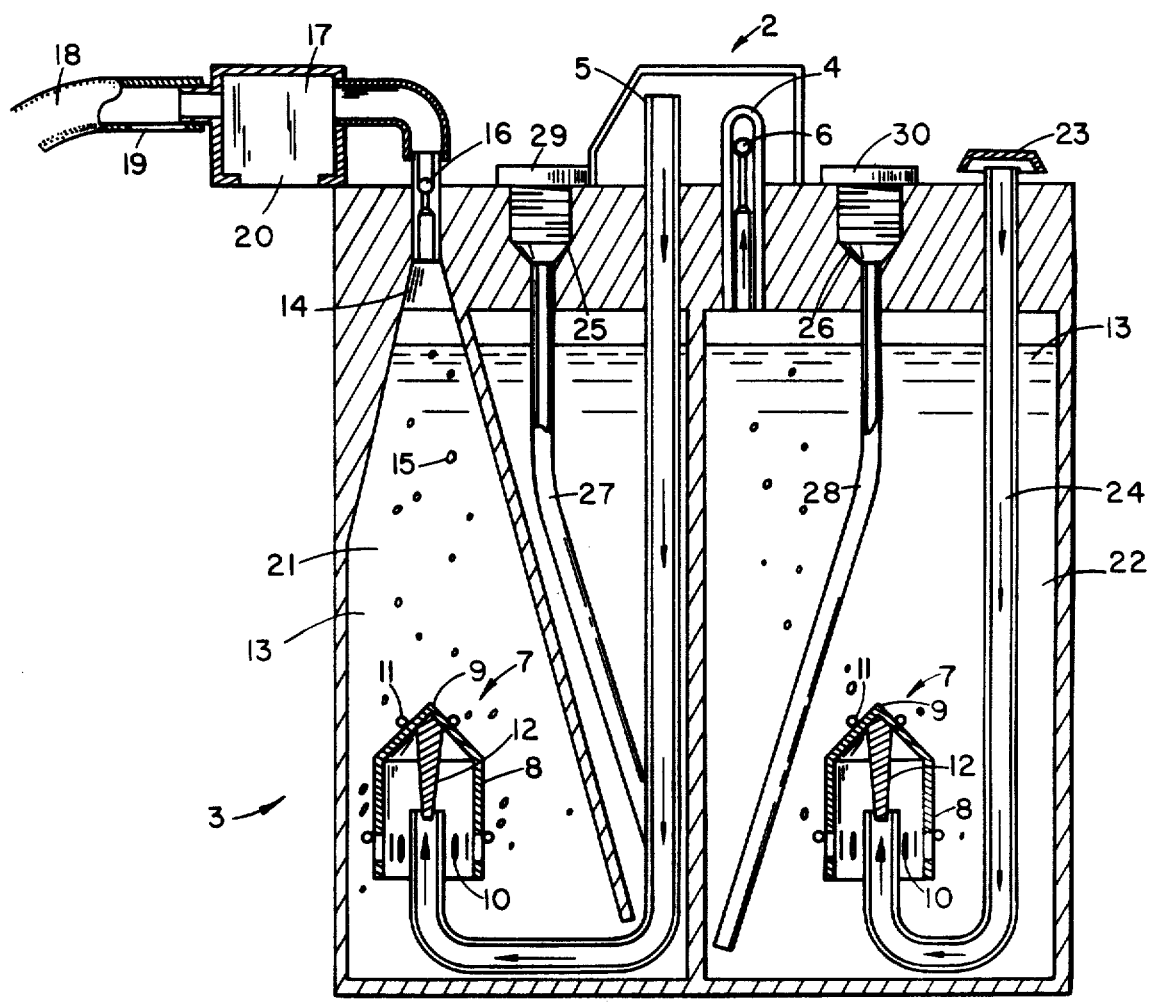
FIG. 2 is a sectional elevational view of the chambers of this invention.
Figure 4:
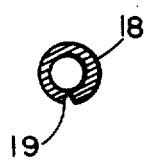
FIG. 4 is a cross sectional view of the exhaust tube of this invention.

Referring now to FIGS. 1 through 4. Wet cell battery 1 is for all intents and purposes the same as the batteries commonly used in automobiles and other vehicles and the like. This invention provides battery 1 with a top rail 2 which sealably covers the fill ports of battery 1 and a side chamber 3 which communicates with rail 2 by way of gas intake tube 4 and gas exit tube 5. Rail 2 and chamber 3 are joined with battery 1 so as to become substantially an integral part of battery 1. Alternative constructions wherein chamber 3 is positioned away from battery 1 and communicates with rail 2 by way of extensions of tubes 4 and 5 are within the scope of the invention but are less preferred than the substantially unitary constructions illustrated in the drawings.

Prior art apparatus which performed the above described functions have heretofore been multi unit apparatus that are suited for use in stationary applications but are not capable of being incorporated into a compact substantially unitary construction with a battery as is achieved by this invention. The achieving of an explosion proof, substantially unitary battery construction requires the incorporation into a single structure of a multiplicity of enabling functions. The following descriptions set forth these functions and their manner of incorporation into a compact and effective unitary construction. The operating principle is that gases entering or leaving the apparatus must bubble through a reservoir of non combustible, non freezing liquid such as the anti freeze and water mixtures used in automobile radiators, thereby foreclosing the possibility of ignition from an external source reaching the interior of the battery by being propagated through the gas venting and/or intake routes which are necessary to the proper functioning of a wet cell battery.

Chamber 3 is shown as being of transparent material for the sake of illustration. Chamber 3 is joined with rail 2. At times of increase in gas pressure in rail 2 gas pressure is increased in exit tube 5. Intake 4 check valve 6 prevents the reverse flow of gas into intake tube 4. Gas pressure causes gas to fill exit flow cup 7. Flow cup has a cylindrical body 8 and conical top 9 and cylindrical body 8 has exit ports 10 around its lower perimeter. Retainer pins 11 prevent cup 7 from floating free while truncated cone shaped stopper 12 serves to seal tube 5 against counter flow.

Exiting gas then bubbles through exit ports 10 and through non flammable liquid 13 which may be provided with anti freeze protection as required by circumstances. Gas bubbles 15 then are collected in conical receiver 14 where they are conducted through gas exit check valve 16 and then through condensate chamber 17 and therefrom to and through exhaust tube 18. Exhaust tube 18 serves to carry the exiting gases away from battery 1 to where they can be safely burned or exhausted to the atmostphere. Exhaust tube 18 is provided with intermittent longitudinal slits 19 which serve to relieve pressure in the tube should ignition occur in the tube. Chamber 17 is provided with a bottom port 20 through which condensate may escape. Chamber 3 is divided into two substantially separate chambers; gas exit chamber 21 and gas entrance chamber 22.

The operation of gas entrance chamber 22 is similar to that of exit chamber 21 except that chamber 22 serves to permit the safe entry of outside air into rail 2 at times of low pressure in rail 2. Ambient air enters fresh air intake 23 and is conducted by intake tube 24 to entrance flow cup 7' which is functionally the same as exit flow cup 7 of chamber 21. Intake air then bubbles to the top of chamber 22 where it enters gas intake tube 4 and the pressure in rail 2 is raised to approximately that of the pressure outside of the battery.

Chambers 21 and 22 are provided with fill ports 25 and 26 respectively which have attached thereto fill tubes 27 and 28 respectively which extend to the bottom of chambers 21 and 22 respectively and which are ordinarily filled with liquid 13 and thereby preclude fill ports 25 and 26 from becoming routes of ignition to the interior of battery 1. Fill ports 25 and 26 are provided with caps 29 and 30 respectively. Fill ports 25 and 26 may serve the auxiliary function of permitting the use of a syringe to remove liquids from chambers 21 and 22 respectively should they become contaminated.

While the apparatus described above, when incorporated with a wet cell battery, will serve to render the battery substantially explosion proof, the sealing of rail 2 over the battery fill ports creates a barrier to the inspection of the fluid level in the cells and/or to the adding of liquid to the cells without providing a route of ignition to the interior of the battery. These objections are overcome by providing rail 2 with a novel inspection tube 31 and fill apparatus 32. Inspection tube 31 has a closed transparent top 33 and an opaque body 34 having a belled lower end 35 which resides over battery plates 36 and float ball 37. When ball 37 is floated to seal the lower end of opaque tube 34 no light is seen at the bottom of inspection tube 31 and the liquid level is satisfactory. The liquid level in the cell is sufficiently low to permit bell 37 to drop below the opening of opaque body 34 light will pass into the cell through transparent top 33 and ball 37 can be seen in the inspection tube. Fluid is then added until ball 37 again seals the opening to opaque body 34.

Rail 2 is further provided with syringe attachment ports 38. Ports 38 may be provided with caps 50 to guard against accumulation of dirt in the ports. Fluid injection syringe 39 is threadably engaged with attachment port 38 and advanced therein so as to displace check cylinder 40 against the opposition of spring 41 so as to permit the injection of fluid from syringe 39 through outlet 42 into cell fill tube 43. Once the fluid level in the cell is returned to a satisfactory level syringe 39 is removed from attachment port 38 and spring 41 causes cylinder 40 to reseal port 38. Port 38 and fill tube 43 may serve to permit the use of a syringe similar to syringe 39 to withdraw fluid from the cell for the purpose of testing the fluid.

Inspection tube 31 and fill tube 43 may be supported by battery fill port guide 44 which serves to index rail 2 to the battery fill ports and to prevent splashing of liquids from the battery cells while at the same time permitting the passage of gases to and from the cells.

While an enabling disclosure of the preferred embodiment of the invention has been provided herein it should be understood that numerous variations of the configurations of the components of the invention may be had without departing from the scope of the invention. Therefore the scope of the invention should not be limited to the disclosed embodiments but should only be limited by the appended claims and all equivalents thereto which would become apparent to one skilled in the art.

I Claim:

1. An explosion proof battery assembly having a wet cell battery with top fill ports and verticle sides and being provided with an ignition suppressing apparatus wherein the apparatus comprises;
   (a) a rail structure secured over the fill ports
   (b) a chamber secured to one of the verticle sides of the battery and the chamber is divided into two independent sealed liquid filled chambers; an air intake chamber and a gas exit chamber,
   (c) apparatus for conducting ambient air from outside the battery, into the intake chamber by way of a fresh air intake tube and therefrom into an inverted flow cup which is maintained in a submersed position in the liquid filled gas intake chamber and the intake air is bubbled through the liquid and is conducted therefrom to a gas intake tube joining the air intake chamber with the rail,
   (d) apparatus for conducting combustible gases from the rail to the gas exit chamber by way of a gas exit tube and therefrom into an inverted cup which is maintained in a submerged position in the liquid filled gas exit chamber and the combustible gases are bubbled through the liquid and are conducted therefrom to a cohdensation chamber and therefrom to an exhaust tube which serves to conduct the combustible gases away from the battery to an area where the gas is safely disposed of.

2. The assembly of claim 1 wherein the liquid is a non-combustible liquid having constituents which give the liquid a low freezing point in a manner analogous to that of anti freeze liquids used in car radiators and the cups of the intake and exit chambers have inverted cone shaped stoppers positioned over the open ends of the air intake tube and the gas exit tube respectively so that in the event of a pressure reduction in the cups, the cups will descend in the liquid and stopper the tube over which the cup is positioned and thereby prevent reverse gas flow in the assembly.

3. The assembly of claim 1 wherein the exiting combustible gases pass through a condensation chamber wherein liquids condensing due to pressure or temperature changes are collected and discharged and the exiting gases pass therefrom through an exhaust tube having intermittent longitudinal slits therein which serve to relieve pressures inside the tube in the event of ignition of the gases inside the tube.

4. The assembly of claim 1 wherein the rail is provided with an inspection tube for each fill port of the battery and the inspection tube has a closed transparent top portion which passes through the rail and an opaque cylindrical body having at its bottom a belled open end that in operation resides over plates of the battery and below the surface of liquid in a battery cell and a float bell is positioned in the belled open end so that the bell will float to the top of the belled open end and prevent light from entering the cell when the liquid level of the cell is satisfactory.

5. The assembly of claim 1 wherein the rail is provided a fill apparatus for each fill port of the battery and the apparatus has a sealed threaded receiver for receiving a similarly threaded syringe and the syringe and the receiver are configured so that a projection on the syringe serves to open a valve during the act of threadably engaging the syringe and the receiver and the valve in the open position permits the passage of liquids to and from the battery cell by way of a cell fill tube which communicates between the liquid in the cell and the valve of the fill apparatus.

* * * * *